(No Model.)
C. P. McCLANATHAN.
CLEARER FOR CORN PLANTER WHEELS.
No. 549,326. Patented Nov. 5, 1895.
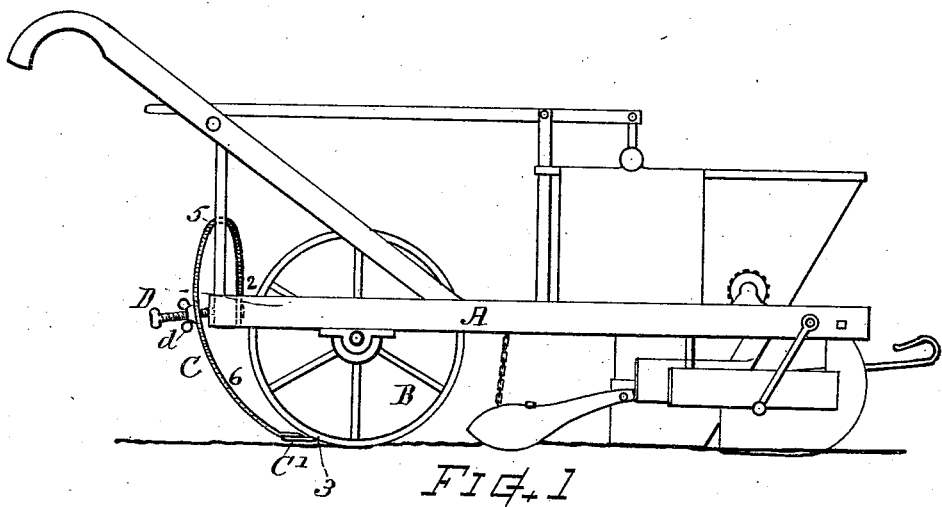
Fig. 1
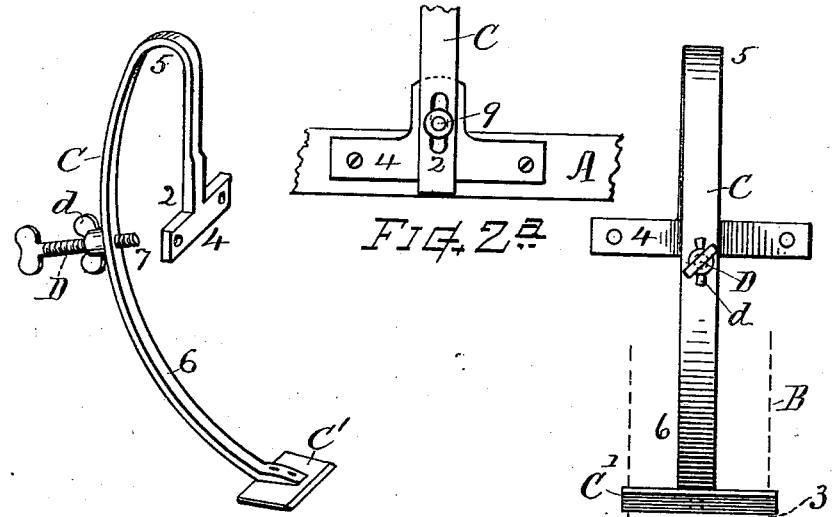
Fig. 2　　Fig. 2ª　　Fig. 3
Witnesses.　　Inventor.
Ella P. Blunt.　　Charles P. McClanathan
Simeon E. King　　By Chas. H. Burleigh
　　　　Attorney

UNITED STATES PATENT OFFICE.

CHARLES P. McCLANATHAN, OF OAKHAM, MASSACHUSETTS.

CLEARER FOR CORN-PLANTER WHEELS.

SPECIFICATION forming part of Letters Patent No. 549,326, dated November 5, 1895.

Application filed February 28, 1895. Serial No. 539,988. (No model.)

*To all whom it may concern:*

Be it known that I, CHARLES P. MCCLANATHAN, a citizen of the United States, residing at Oakham, in the county of Worcester and State of Massachusetts, have invented a new and useful Clearer for Corn-Planter Wheels, of which the following, together with the accompanying drawings, is a specification sufficiently full, clear, and exact to enable persons skilled in the art to which this invention appertains to make and use the same.

The object of my present invention is to provide an improved clearer for scraping adhering soil from the follower-wheel in that class of machines used for planting corn, beans, peas, or other seed, and that will detach such adhering soil in a manner and at such position as will cause it to fall back into the place from which the wheel receives it, thereby enabling the machine to be more successfully operated in damp or sticky soil and obviating the necessity of re-covering by hand seeds from which soil is displaced; also, to provide means for adjusting the same. These objects I attain by the mechanism illustrated in the drawings, wherein—

Figure 1 is an outline side view of a corn-planting machine, showing my improved clearer as applied thereto. Fig. 2 is a perspective view of my clearing device. Fig. 2ª shows a modification in the manner of attaching the device to the cross bar or frame, and Fig. 3 is a rear view of my clearer.

On the drawings the part marked A is the frame of the machine, carrying at its forward part the usual appliances for opening a furrow, dropping the corn or other seed, and distributing fine fertilizer; also appliances for closing the furrow and for guiding the machine, all of which are old and well known.

B indicates the tramp-wheel or follower for rolling down the soil that covers the furrow after the seed is dropped, the axis of said wheel being journaled on the frame in suitable manner.

My improved clearer consists of a resilient bar or arm C, adapted for attachment at its upper end to the cross bar or frame A of the planting-machine and having at its lower end a transversely-disposed scraper or blade C', that acts against the face of the follower-wheel B at a position 3, low down and immediately in rear of the tread or point where the wheel rolls upon the ground, the resilient supporting-arm being downwardly and forwardly curved, so as to hold the scraping-blade against the wheel-face at that position with a strong forwardly-directed but yielding pressure.

This clearer is best made from a moderately-stiff resilient bar of flat steel bent to form the spring-arm C, one end thereof being connected at 2 (rigidly or adjustably) to an attaching-plate 4, or having holes therein to facilitate screwing or bolting it to the cross bar or frame A. From this attaching end the bar extends upward for a portion and is then bent over on a half-circle or arch, as at 5. From thence it extends downward with an under forward curve 6 to the scraper C', which latter is attached to the end of the spring-bar C in transverse position by rivets, welding, or otherwise and in such relation that its forward edge will scrape the face-surface of the wheel B. The arm or spring-bar C is made so as to normally give a forwardly-upward springing action toward the under side of the wheel, and is provided with a screw-bolt D at a position adjacent to the frame cross-bar, which bolt is arranged through its rear portion and adapted to turn in, with its end 7 against the cross-bar or against the inner portion 4 for adjusting the springing movement or controlling the forward flexure and regulating the action of the scraper upon the wheel. A check-nut *d* may be arranged on this screw-bolt, and said bolt and check-nut can each be provided with thumb-ears or be fitted to be turned by a wrench, as preferred.

When working corn-planters in damp sticky soil, the soil under pressure has a strong tendency to "suck up" or adhere to and become lifted by the face of the wheel, and more especially does this occur at the positions where the corn and dry fertilizer are dropped. Hence with the ordinary form of clearer it occurs that frequently the corn is left exposed by reason of the wheel taking up the soil and dropping it at a position somewhat away from that at which it was picked up. By my invention the corn-planter is adapted for more successful operation in damp or sticky soil.

In my improved clearer the scraper-blade acts upon the wheel at such position and in such manner that adhering soil is removed and dropped back into substantially the same position from which it was taken by the wheel-surface, instead of being carried on the wheel a half-revolution and then dropped at a position away from the uncovered seed, leaving the seed exposed or requiring its re-covering by hand.

This clearer can be made and applied to corn-planting machines now in use. The scraper-edge can be concave or convex to fit the face of the wheel, if such form is required.

It will be understood that I do not broadly claim the combining of a scraper with the wheel of a corn-planter irrespective of construction or arrangement, as I am aware that scrapers of different nature have heretofore been used.

What I claim as my invention, and desire to secure by Letters Patent, is—

1. The within described clearer for corn-planting machines, consisting of the downwardly and forwardly curved arm having at one end facilities for its connection to the supporting frame, the transverse scraper-blade fixed to the lower end of said arm, and the adjusting screw disposed in said arm and adapted for resistant control of the forward flexure of the same, substantially as set forth.

2. The combination, with the follower-wheel in a corn-planting machine, of the clearer-blade disposed to clean the face of said wheel near the point of tread, said blade carried by the resilient forwardly-pressing arm disposed in rear of the wheel and having its upper part formed with an arched return bend, and its end attached to the machine frame, an adjusting-screw arranged through the said arm adjacent to the cross-frame, said screw adapted to turn in against said frame, for regulating the forward action of the clearer relatively to the wheel surface, all substantially as and for the purpose set forth.

3. The combination, with the follower-wheel in a corn and fertilizer planting machine, of the yielding clearer composed of a transversely disposed blade that clears the surface of said wheel adjacently in rear of its point of tread, and the downwardly and forwardly curved spring-bar carrying said blade, formed as shown and having its upper end adjustably connected with the cross frame of the machine, in rear of the wheel, substantially as and for the purpose set forth.

Witness my hand this 25th day of February, A. D. 1895.

CHARLES P. McCLANATHAN.

Witnesses:
JOHN C. BARTHOLOMEW,
WILLIAM H. WHITE.